US011733910B2

(12) United States Patent
Heath

(10) Patent No.: US 11,733,910 B2
(45) Date of Patent: Aug. 22, 2023

(54) MEMORY SUB-SYSTEM DATA LOSS PREDICTION

(71) Applicant: Micron Technology, Inc., Boise, ID (US)

(72) Inventor: Nicholas T. Heath, Pittsboro, NC (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/462,408

(22) Filed: Aug. 31, 2021

(65) Prior Publication Data

US 2023/0066851 A1 Mar. 2, 2023

(51) Int. Cl.
*G06F 3/06* (2006.01)

(52) U.S. Cl.
CPC .......... *G06F 3/0653* (2013.01); *G06F 3/0625* (2013.01); *G06F 3/0679* (2013.01)

(58) Field of Classification Search
CPC ..... G06F 3/0653; G06F 3/0625; G06F 3/0679
See application file for complete search history.

(56) References Cited

U.S. PATENT DOCUMENTS

| 7,085,152 | B2 | 8/2006 | Ellis |
| 7,342,841 | B2 | 3/2008 | Jain |
| 8,289,797 | B2 | 10/2012 | Jain |
| 2015/0106556 | A1* | 4/2015 | Yu ................... G06F 12/0246 711/103 |
| 2022/0326862 | A1* | 10/2022 | Chen .................. G06F 3/0679 |

* cited by examiner

*Primary Examiner* — David Yi
*Assistant Examiner* — Dustin B. Fulford
(74) *Attorney, Agent, or Firm* — Brooks, Cameron & Huebsch, PLLC

(57) ABSTRACT

A method includes utilizing, while delivery of power from a main power supply to a memory sub-system is interrupted, a processing device of the memory subsystem to monitor a characteristic of the memory sub-system associated with data retention at a non-volatile memory component of the memory sub-system. The method further includes utilizing, while delivery of power from a main power supply to a memory sub-system is interrupted, a processing device of the memory subsystem to predict, based on the monitored characteristic, an impending data loss event for the non-volatile memory component.

19 Claims, 5 Drawing Sheets

MEMORY SUB-SYSTEM DATA LOSS PREDICTION

TECHNICAL FIELD

Embodiments of the disclosure relate generally to memory sub-systems, and more specifically, relate to memory sub-system data loss prediction.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
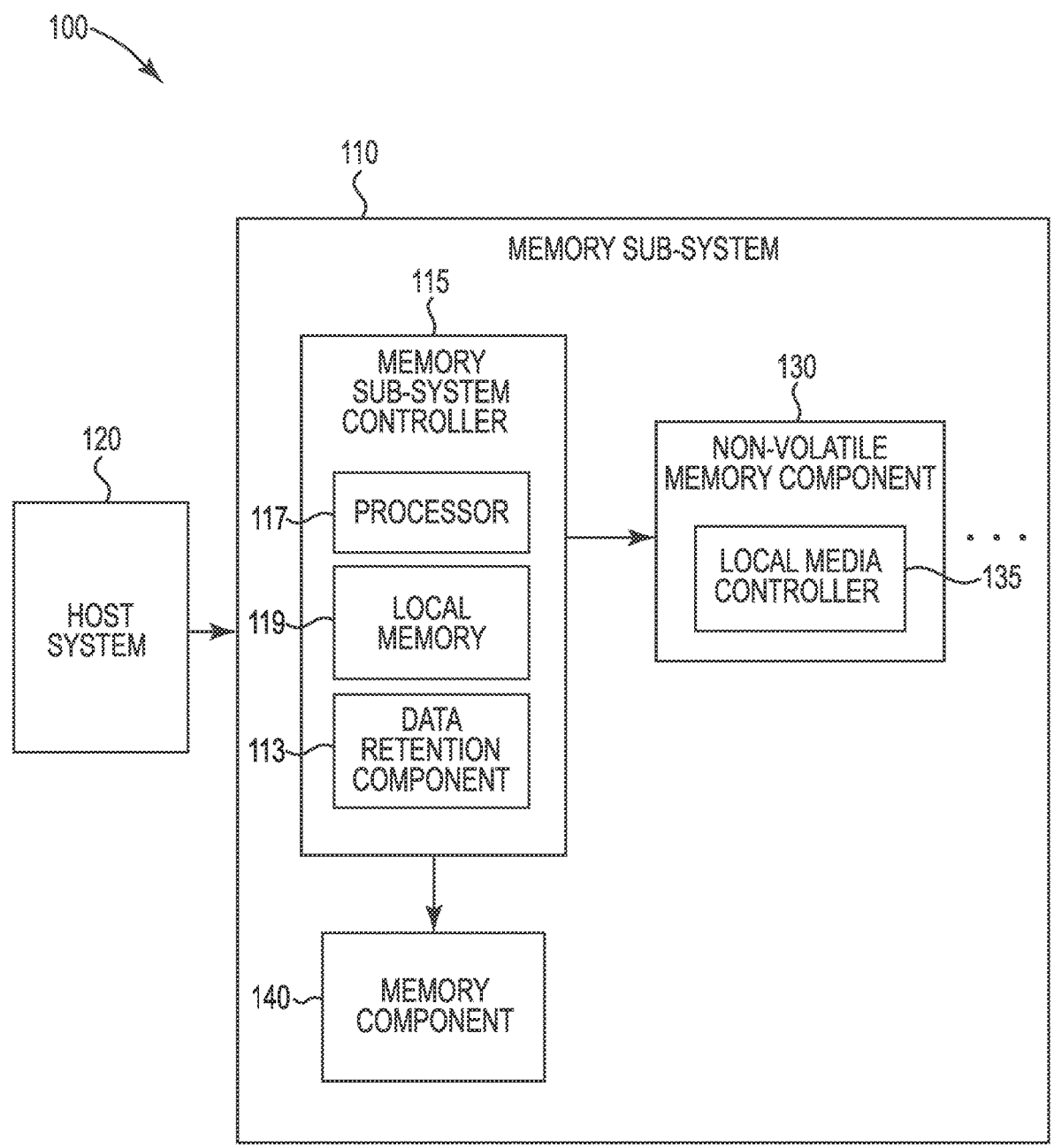
FIG. 1 illustrates an example computing system that includes a memory sub-system in accordance with some embodiments of the present disclosure.

Aspects of the present disclosure are directed to memory sub-system data loss prediction, in particular to memory sub-systems that include a memory sub-system data loss prediction component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

During operation, a memory sub-system can experience fluctuations of characteristics of the memory sub-system. For example, a memory sub-system can experience fluctuations in thermal characteristics, such as operating temperature. For example, because electrical current is utilized to provide power to the memory sub-system, the memory sub-system can exhibit temperature fluctuations during operation. Further, a memory sub-system can experience temperature fluctuations based on the environment in which the memory sub-system is deployed.

Although some amount of temperature fluctuation is tolerable within a memory sub-system, the memory sub-system can be adversely affected if such temperature fluctuations meet certain criteria (e.g., exceed thresholds). For example, if a memory sub-system is exposed to temperatures that are greater than a threshold safe operating temperature range, the memory sub-system can experience degraded performance and, in some instances, can fail. For example, in some embodiments, if the temperature of the memory sub-system (or of components of the memory sub-system) reach or exceed a threshold operating temperature a data loss event may occur.

A data loss event may include the degradation and/or loss of data stored in the memory devices of the memory sub-system such that the stored data is no longer present and/or no longer accurately represents its original values. In some examples, a data loss event may be marked by an error rate of the data stored in the memory sub-system exceeding the error correction capability of an error correction component of the memory sub-system.

In order to avoid data loss events during operation of a memory sub-system, active mitigation measures may be utilized to control the fluctuations of the characteristics of the memory sub-system. For example, an active cooling component such as a fan may be utilized in order to cool the memory sub-system during operation. The active mitigation measures rely on and/or utilize power supplied by a main power supply provided to the memory sub-system during operation. For example, a device including the main power supply may be physical attached (e.g., via a power cord, backplane, power bus, etc.) to a main power source such as an outlet connected to an electrical power transmission grid. The main power supply may be utilized to run the active cooling component in addition to operating other components of the device while the device is powered on and receiving its full allocation of a power supply.

As mentioned above, a memory sub-system can experience temperature fluctuations based on the environment in which the memory sub-system is deployed. Such environmental influences may persist regardless of the power state (e.g., powered on, powered off, sleeping, disconnected from the main power supply, etc.) of the memory sub-system. However, as described above the active mitigation measures and/or their control may be entirely dependent on the power state of the memory sub-system. For example, an active cooling component may require the memory sub-system to be connected to the main power supply, receiving power from the main power supply, and/or be powered on in order to provide active cooling of the memory sub-system. Therefore, when the memory sub-system is not connected to the main power supply, receiving power from the main power supply, and/or powered on, the memory sub-system may be unable to mitigate environmental conditions which may cause characteristics of the memory sub-systems to exceed the aforementioned thresholds and cause data loss events.

Many events may lead to the memory sub-system being powered down and/or disconnected from a main power supply. For example, a natural disaster or other interruption to power supply production and transmission may interrupt the supply of power to the memory sub-system. Further, a reduced capacity to service memory sub-systems and/or a reduced need for memory sub-systems may lead to a power down or disconnection event. Furthermore, a cost savings or space constraint may lead to a power down or disconnection event. Regardless of the cause, the memory sub-system that is powered down or disconnected from the main power supply may be facing degradation of its stored data resulting from the lack of power supply and exposure to environmental conditions that it is unable to mitigate due to lack of a main power supply.

Meanwhile, users of the memory sub-system may be unaware of the conditions influencing the memory sub-system it its powered down state. For example, a user may not be cognizant of the environmental conditions in a shut down or partially shut down data center or storage closet where a memory sub-system resides while it is powered down and/or disconnected from the main power supply. A user may, at a later time, reconnect the memory sub-system to a main power supply and/or power the memory sub-system back on and expect the data stored thereupon to be present and have retained its fidelity. However, in some examples the environmental conditions may have cause characteristics of the memory sub-system to exceed a threshold level for a threshold amount of time associated with data loss events. As such, the user may be faced with unexpected and/or catastrophic data loss.

Aspects of the present disclosure address the above and other deficiencies by utilizing, when delivery of power to a non-volatile memory sub-system is interrupted, a processing device of the non-volatile memory sub-system to monitor a characteristic of a non-volatile memory sub-system associated with data retention at the non-volatile memory sub-system. For example, the processing device may cause a temperature of the non-volatile memory sub-system and/or its non-volatile memory components, a duration of the temperature of the non-volatile memory sub-system and/or its non-volatile memory components, and/or a duration of the interruption of the power delivery from the main power supply to the non-volatile memory sub-system to be monitored. The processing device may predict, based on the monitored characteristic, an impending data loss event for data stored at the non-volatile memory subsystem (e.g., data stored on the non-volatile memory components of the non-volatile memory subsystem). For example, the processing device may project a bit error rate (BER) associated with the non-volatile memory components of the non-volatile memory sub-system being exposed to the monitored characteristics over the monitored amount of time. The processing device may predict an impending data loss event when the projected BER exceeds a data retention limit such as a threshold amount of errors able to be corrected by ECC components of the non-volatile memory sub-system. Various warnings may be generated when the impending data loss event is predicted.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory components 130, 140 can include any combination of the different types of non-volatile memory devices and/or volatile memory devices. The volatile memory devices (e.g., memory component 140) can be, but are not limited to, random access memory (RAM), such as dynamic random-access memory (DRAM) and synchronous dynamic random-access memory (SDRAM).

One example of non-volatile memory components is a negative-and (NAND) memory device (also known as flash technology). A non-volatile memory component may be a package of one or more dice. Each die can consist of one or more planes. Planes can be groups into logic units (LUN). For some types of non-volatile memory components (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

Some examples of non-volatile memory devices (e.g., memory component 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system may include a memory sub-system controller 115 (or controller 115 for simplicity) which can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a data retention component 113. In some embodiments, the memory sub-system controller 115 includes at least a portion of the data retention component 113. For example, the memory sub-system controller 115 can include a processor 117 (processing device) configured to execute instructions stored in local memory 119 for performing the operations described herein. In some embodiments, the data retention component 113 is part of the host system 110, an application, or an operating system.

For example, the data retention component 113 may include hardware (e.g., various circuitry and/or physical/electrical components) and/or instructions executable by such hardware to accomplish the operations described herein. In such examples, the hardware and/or instructions may be part of and/or integrated partially or fully with the memory sub-system controller 115 and/or its components. In some examples, the data retention component 113 may include non-transitory machine-readable instructions (e.g., stored at and/or executable from local memory 119 executable by processor 117 to accomplish such operations.

However, examples are not so limited. For example, the data retention component 113 may include hardware and/or instructions executable by such hardware that are separate from and/or physically distinct from the memory sub-system controller 115 and/or its components. In such examples, the data retention component may not be part of and/or integrated partially or fully with the memory sub-system controller 115 and/or its components but may be communicatively coupled thereto. For example, the data retention component 113 may be a separate controller (e.g., a microcontroller) that may be at least partially physically and/or functionally separate from the memory sub-system controller 115 but may be communicatively coupled to the memory sub-system controller 115. For example, the data retention component 113 may include a processing device configured to execute instructions stored in local memory for performing the operations described herein, at least a portion of the processing device, the instructions, and/or the local memory being physically distinct and/or remotely located from the components of the memory sub-system controller 115.

Although not shown in FIG. 1 so as to not obfuscate the drawings, the data retention component 113 may include and/or be communicatively coupled to various circuitry to facilitate monitoring a characteristic of the memory sub-system 110. The monitored characteristic may include a characteristic of the memory sub-system 110 and/or its components (e.g., non-volatile memory component 130) associated with data retention at the memory sub-system 110 and/or at a specific component (e.g., non-volatile memory component 130) of the memory sub-system 110. For example, the data retention component 113 may include and/or be communicatively coupled to various circuitry to facilitate monitoring of a temperature (e.g., a temperature sensor) of the memory sub-system 110, a duration of time that the memory sub-system 110 spent at the monitored temperature, a duration of an interruption of the delivery of power from the main power supply to the memory sub-system 110, etc. In some examples, the various circuitry (e.g., temperature sensor, duration sensor, power supply sensor, etc.) to facilitate monitoring of a temperature, temperature duration, and/or duration of power supply removal specifically of the non-volatile memory component 130 may report and/or make available for retrieval its measurements to the data retention component 113 directly and/or may write its measurements to a data repository commonly accessible by the data retention component 113 and/or the sensor.

In some examples, the data retention component 113 may include various circuitry utilizable, when delivery of power from a power supply (e.g., a main and/or primary power supply) to the memory sub-system 110 is interrupted. An interruption of power delivery from a main power supply may include a temporary or permanent reduction or elimination of power provided from the main power supply to the memory sub-system 110 and/or its components. For example, an interruption of power delivery from the main power supply may include a disruption and/or discontinuation of power delivery from a 12V main power supply to a memory sub-system 110 and/or its components across a main power rail of the memory sub-system 110.

An interruption of the delivery of power from the main power supply may include an instance when a main power supply is decoupled (e.g., unplugged) or otherwise removed from the memory sub-system 110. An interruption of the delivery of power from the main power supply may include an instance when a main power supply remains coupled to the memory sub-system 110 but power is no longer being delivered from the main power supply to the memory sub-system 110. An interruption of the delivery of power from the main power supply may include an instance where the memory sub-system 110 is switched into an off state or a sleep state. An interruption of the delivery of power from the main power supply may include an instance when a connection to the main power supply is damaged. An interruption of the delivery of power from the main power supply may include an instance when a power outage, a blackout, a brown out, a blown fuse, a tripped circuit breaker, etc. disrupts the flow of power from a main power source to the memory sub-system 110. An interruption of the delivery of power from the main power supply may include an instance when a main power supply is exhausted and/or has no or not enough power to deliver to the memory sub-system 110 to render it fully operational.

The data retention component 113 may include various circuitry utilizable, when delivery of power from a power supply (e.g., a main and/or primary power supply) to the memory sub-system 110 is interrupted to facilitate monitoring the characteristic of the memory subsystem 110 associated with data retention at a non-volatile memory component 130 of the memory subsystem 105. For example, the data retention component 113 can include circuitry and/or special purpose circuitry in the form of an ASIC, FPGA, state machine, and/or other logic circuitry that can orchestrate and/or perform operations (e.g., utilizing power provided from an auxiliary or secondary power supply, a reserve of power stored in a battery or capacitor, etc.) in the absence of and/or without power from the main power supply to monitor the characteristic of the memory subsystem 110 and/or its components.

In some examples, the data retention component 113 may be operated in the absence of and/or without power from the main power supply to monitor to monitor a temperature of the memory sub-system 110, a duration of time over which the memory sub-system 110 was exposed to and/or remained at that temperature, whether the memory sub-system 110 is receiving power from a main power supply, and/or a duration of an interruption of power delivery from a main power supply to the memory sub-system 110.

In some examples, the data retention component 113 may be operated in the absence of and/or without power from the main power supply in order to monitor such characteristics as they relate to specific components and/or groups of components of the memory sub-system 110. For example, the data retention component 113 may be operated in the absence of and/or without power from the power supply to monitor a temperature of a specific non-volatile memory component 130 and/or a group of non-volatile memory components 130, a duration of time that the specific non-volatile memory component 130 and/or a group of non-volatile memory components 130 is exposed to a particular temperature and/or range of temperatures, whether the specific non-volatile memory component 130 and/or a group of non-volatile memory components 130 is receiving power from a main power supply, and/or a duration of time that the receipt of power from the main power supply to the specific non-volatile memory component 130 and/or a group of non-volatile memory components 130 is interrupted. In some examples, the data retention component 113 may be operated in the absence of and/or without power from the main power supply to monitor a temperature, a duration of time exposed to temperature, whether power delivery from a main power supply has been interrupted, and/or a duration of time a main power supply has been interrupted for particular portions of the non-volatile memory component 130 such as particular memory die, planes, blocks, pages and/or groups thereof.

The data retention component 113 may be utilized, when deliver of power from a power supply to the memory sub-system 110 is interrupted, to predict, based on the monitored characteristic, an impending data loss event for the non-volatile memory component 130. A data loss event may include an instance when an original data value stored on the non-volatile memory component 130 is lost, modify, degraded, and/or otherwise rendered unreadable as the original data value. The data loss event may include instances where the original data value is readable as a different data value from the original value and/or instances where the original data value is no longer readable. For example, the data loss event may include instances where the stored data value is erroneous with respect to its original value and/or instances where a stored data value is absent.

An impending data loss event may include a data loss event that has happened, is going to happen, is projected to happen if conditions (e.g., the monitored characteristic) remain the same, is trending toward happening under the monitored characteristic, has exceeded or will exceed a probability threshold of happening, etc. For example, an impending data loss event may include a data loss event that has a likelihood of occurring that is above a certain threshold unless the currently monitored conditions are altered (e.g., power is restored to the memory sub-system 110, the temperature of the non-volatile memory component 130 is reduced, etc.).

The likelihood of a data loss event and/or a determination of whether it is impending may be based on physical properties, capabilities, and/or manufacturer specifications for the memory sub-system 110 and/or the non-volatile memory component 130. For example, a specification may exist for the memory sub-system 110 and/or the non-volatile memory component 130 of the memory subsystem 110 which specifies a relationship between an amount of time that power delivery from a power supply to the memory sub-system 110 is interrupted and an amount and/or likelihood of expected data loss events for the memory sub-system 110 and/or the non-volatile memory component 130 of the memory subsystem 110. Such a specification may be utilized to identify threshold value amounts of time that, when power delivery from a power supply is interrupted over, predict and/or indicate an impending data loss event will occur.

Likewise, a specification may exist for the memory sub-system 110 and/or the non-volatile memory component 130 of the memory subsystem 110 which specifies a relationship between a temperature of the memory sub-system 110 and/or the non-volatile memory component 130 and an amount and/or likelihood of expected data loss events for the memory sub-system 110 and/or the non-volatile memory component 130 of the memory subsystem 110. Further, the specification may specify a relationship between a time at the temperature for the memory sub-system 110 and/or the non-volatile memory component 130 and an amount and/or likelihood of expected data loss events for the memory sub-system 110 and/or the non-volatile memory component 130 of the memory subsystem 110. Such a specification may be utilized to identify threshold value temperatures and/or amounts of time at those temperatures that, when delivery of power from a power supply is interrupted over, predict or indicate an impending data loss event will occur.

In some examples, an error rate associated with stored data values may be utilized to identify threshold error rate values that, when power delivery from a main power supply is interrupted, predict and/or indicate an impending data loss event. For example, a raw bit error rate (RBER) associated with the memory sub-system 110 and/or the non-volatile memory component 130 may signify an impending data loss event when the RBER exceeds a threshold error rate value defined by an error correction capability of an ECC component of the memory sub-system 110.

As such, the data retention component 113 may be utilized, when delivery of power from a main power supply to the memory sub-system 110 is interrupted and/or in the absence of and/or without utilizing power from the main power supply, to predict, based on the monitored characteristic, an impending data loss event for the non-volatile memory component 130 by comparing the monitored characteristic to a threshold value of the monitored characteristic associated with the data loss event such as those threshold levels described above. For example, the data retention component 113 may predict an impending data loss event for the non-volatile memory component 130 by comparing a duration of an interruption of the delivery of power from the main power supply to the memory sub-system 110 and/or the non-volatile memory component 130 to threshold value amounts of time that, when delivery of power from a main power supply is interrupted over, is predicted of an impending data loss event. In some examples, the data retention component 113 may predict an impending data loss event for the non-volatile memory component 130 by comparing a temperature and/or a time at a temperature for the memory sub-system 110 and/or the non-volatile memory component 130 to the threshold value temperature and/or time at temperature amounts that, occurring during an interruption of the delivery of power from the main power supply, is predictive of an impending data loss event. In some examples, the data retention component 113 may predict an impending data loss event for the non-volatile memory component 130 by comparing an error rate for the memory sub-system 110 and/or the non-volatile memory component 130 to the threshold amount of error correction capability by an ECC component predictive of an impending data loss event. The prediction of an impending data loss event may be generated at the time one of the above-described monitored characteristics exceeds a threshold value marking conditions associated with data loss. Additionally, the prediction of an impending data loss event may be generated when one of the above-described monitored characteristics is projected to exceed a threshold value in the future based on, for example, an extrapolation of a trend of the monitored characteristic.

In addition, the data retention component 113 may be utilized, when delivery of power to the memory sub-system 110 from the main power supply is interrupted, to generate a data loss warning. For example, the memory sub-system 110 may generate the data loss warning by generating a signal transmitted to and/or retrieved by a host 120. The signal may instigate, by the host 120, a communication and/or a display of the data loss warning to a user and/or administrator of the memory sub-system 110. For example, the memory sub-system 110 may send a signal to the host 120 responsive to the prediction of an impending data loss event for the non-volatile memory component 130. In response to receiving the signal, the host 120 may generate and/or cause the communication of the data loss warning to a monitoring user and/or application.

For example, the data loss warning may include an alert such as an email, a text message, a telephone call, etc. Additionally, or alternatively, the data loss warning may include an alert such as an auditory warning. For example, the data loss warning may include a beep, buzz, chirp, etc. generated by a speaker, piezo electric buzzer, etc. Additionally, or alternatively, the data loss warning may include an alert such as a visual warning. For example, the data loss warning may include causing a light to emit light, causing a light to cease emitting light, causing a light to flash, causing a light to flash a particular pattern, etc. The data loss warning may be a signal to a human user to communicate that a data loss event is impending and to spur the user to intervene such as by restoring the power to the memory sub-system 110.

The data retention component 113 may generate the data loss warning responsive to predicting the impending data loss event. For example, when the monitored characteristic has reached, is projected to reach, exceeds, is projected to exceed, etc. its associated threshold value, the data retention component 113 may generate the data loss warning.

The data retention component 113 may be utilized, when delivery of power to the memory sub-system 110 from a main power supply is interrupted, to persist the data loss warning for a period of time. As such, the data loss warning may be initiated and persisted in the absence of power from the main power supply. For example, the data retention component 113 may persist the data loss warning until the delivery of power from the main power supply to the memory sub-system 110 is restored. The data retention component 113 may persist the data loss warning until an auxiliary power source, powering the data retention component 113 while the primary power supply is interrupted, is exhausted. For example, the data loss warning may be persisted until an auxiliary power reservoir such as a battery or capacitor has its charge depleted.

In some examples, the data retention component 113 may be utilized, when delivery of power from a main power supply to the memory sub-system 110 is interrupted, to determine, based on the monitored characteristic, whether a data retention limit threshold has been reached for the memory sub-system 110 and/or the non-volatile memory component 130. That is, the data retention component 113 may be utilized to determine, based on the monitored characteristic, whether a data retention limit threshold has been reached for the memory sub-system 110 and/or the non-volatile memory component 130 in the absence of power from the main power supply. For example, the data retention limit threshold may include a threshold value of the monitored characteristic which represents a limit amount of the threshold characteristic past which the data loss event is projected to be inevitable and/or uncorrectable. In such examples, the data retention component 113 may be utilized, when delivery of power from a main power supply to the memory sub-system 110 is interrupted, to persist the data loss warning until the data retention limit threshold is determined to have been reached. That is, the data retention component 113 may be utilized to persist the data loss warning until the data retention limit threshold is determined to have been reached, all in the absence of power being delivered from the main power supply. In some examples, once the data retention limit threshold is determined to have been reached a new or different warning may be generated by the data retention component 113 which signifies that a data loss event has likely already occurred at the memory sub-system 110 and/or the non-volatile memory component 130. For example, once the data loss event has likely already occurred, the data retention component 113 may write a message to non-volatile memory warning that the data loss event may have occurred.

In this manner, the data retention component 113 may operate in the absence of power from the main power supply. For example, the data retention component may monitor the memory sub-system 110 for conditions indicative of an impending data loss event, predict such impending data loss events, and/or manage warning users of the data loss events so that they can manually intervene to mitigate and/or prevent data loss in non-volatile memory components 130, all without utilizing power from the main power supply. That is, the data retention component 113 may perform the functionalities described throughout during the interruption of power delivery from the main power supply.

Figure 2:
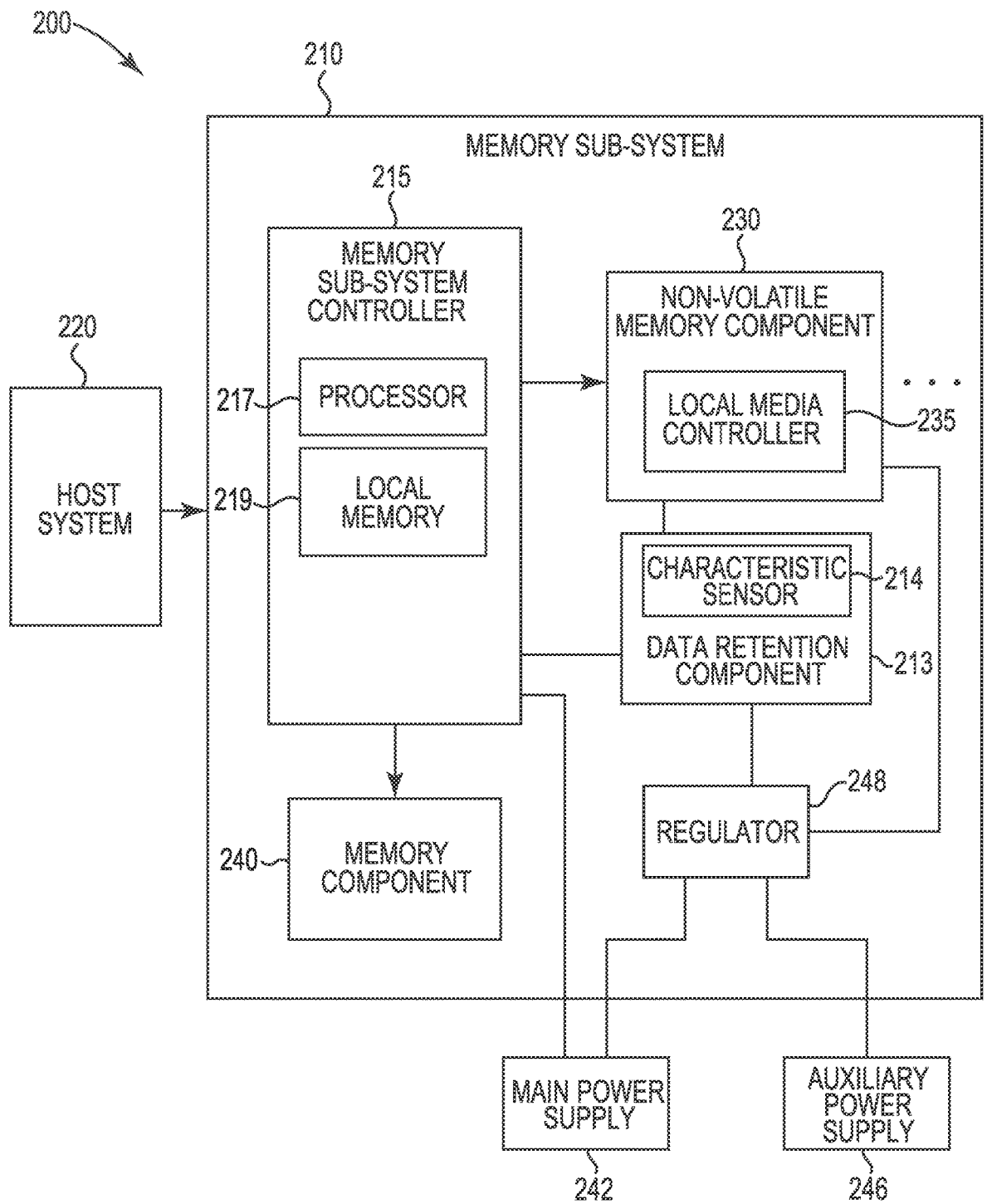
FIG. 2 illustrates an example computing system that includes a memory sub-system in accordance with some embodiments of the present disclosure.

FIG. 2 illustrates an example of a computing system 200 that includes a memory sub-system 210 in accordance with some embodiments of the present disclosure. The system 200 may be a computing system including many elements illustrated in the system 100 FIG. 1 having same and/or similar functions with distinctions therebetween explained below.

The computing system 200 may include a memory sub-system 210. The memory subsystem can include media, such as one or more volatile memory devices (e.g., memory component 240), one or more non-volatile memory devices (e.g., memory component 230), or a combination of such. The computing system 200 can include a host system 220 that is coupled to one or more memory sub-systems 210.

The memory components 230, 240 can include any combination of the different types of non-volatile memory components and/or volatile memory components. In some examples, memory component 240 may include volatile memory devices and memory component 230 may include non-volatile memory components 230.

The memory sub-system may include a memory sub-system controller 215 (or controller 215 for simplicity) which can communicate with the memory devices 230 to perform operations such as reading data, writing data, or erasing data at the memory devices 230 and other such operations.

The memory sub-system controller 215 can include a processor 217 (e.g., a processing device) configured to execute instructions stored in a local memory 219. In the illustrated example, the local memory 219 of the memory sub-system controller 215 includes an embedded memory configured to store instructions for performing various processes, operations, logic flows, and routines that control operation of the memory sub-system 210, including handling communications between the memory sub-system 210 and the host system 220.

In some embodiments, the local memory 219 can include memory registers storing memory pointers, fetched data, etc. The local memory 219 can also include read-only memory (ROM) for storing micro-code. While the example memory sub-system 110 in FIG. 2 has been illustrated as including the memory sub-system controller 215, in another embodiment of the present disclosure, a memory sub-system 210 does not include a memory sub-system controller 215, and can instead rely upon external control (e.g., provided by an external host, or by a processor or controller separate from the memory sub-system).

In general, the memory sub-system controller 215 can receive commands or operations from the host system 220 and can convert the commands or operations into instructions or appropriate commands to achieve the desired access to the memory device 230 and/or the memory device 240. The memory sub-system controller 215 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 230. The memory sub-system controller 215 can further include host interface circuitry to communicate with the host system 220 via the physical host interface. The host interface circuitry can convert the commands received from the host system into command instructions to access the memory device 230 and/or the memory device 240 as well as convert responses associated with the memory device 230 and/or the memory device 240 into information for the host system 220.

The memory sub-system 210 can also include additional circuitry or components that are not illustrated. In some embodiments, the memory sub-system 210 can include a cache or buffer (e.g., DRAM) and address circuitry (e.g., a row decoder and a column decoder) that can receive an address from the memory sub-system controller 115 and decode the address to access the memory device 230 and/or the memory device 240.

In some embodiments, the memory device 230 includes local media controllers 235 that operate in conjunction with memory sub-system controller 215 to execute operations on one or more memory cells of the memory devices 230. An external controller (e.g., memory sub-system controller 215) can externally manage the memory device 230 (e.g., perform media management operations on the memory device 230). In some embodiments, a memory device 230 is a managed memory device, which is a raw memory device combined with a local controller (e.g., local controller 235) for media management within the same memory device package. An example of a managed memory device is a managed NAND (MNAND) device The memory sub-system 110 can include a data retention component 213. In the non-limiting example illustrated in FIG. 2 the data retention component may include hardware and/or instructions executable by such hardware that are separate from and/or physically distinct from the memory sub-system controller 215. For example, the data retention component 213 may not be part of and/or integrated partially or fully with the memory sub-system controller 215 and/or its components but may be communicatively coupled thereto. For example, the data retention component 213 may be a separate controller (e.g., a microcontroller) that may be at least partially physically and/or functionally separate from the memory sub-system controller 215 but may be communicatively coupled to the memory sub-system controller 215. For example, the data retention component 213 may include a processing device configured to execute instructions stored in local memory for performing the operations described herein, at least a portion of the processing device, the instructions, and/or the local memory being physically distinct and/or remotely located from the components of the memory sub-system controller 215.

The data retention component 213 may include and/or be communicatively coupled to various circuitry to facilitate monitoring a characteristic of the memory sub-system 210. For example, the data retention component 213 may include or be communicatively coupled to a characteristic sensor 214. A characteristic sensor 214 may include a device configured to monitor a characteristic of the memory sub-system 210 and/or its components (e.g., non-volatile memory component 230). In some examples, the characteristic sensor 214 may be configured to monitor a characteristic of the entire memory sub-system 210 and/or a characteristic of a portion of the memory sub-system 210. For example, the characteristic sensor may be configured to monitor a characteristic of the non-volatile memory component 230 of the memory sub-system 210 utilizing measurements of the characteristic for the entire memory sub-system 210, a portion of the memory sub-system 210 (e.g., measurements specific to the non-volatile memory component 230), and/or sub-portions of a portion of the memory sub-system 210 (e.g., measurements specific to particular dies, planes, blocks, cells, etc. of the non-volatile memory component 230).

The monitored characteristic may include a characteristic of the memory sub-system 210 and/or its components (e.g., non-volatile memory component 230) associated with data retention at the memory sub-system 210 and/or at a specific component (e.g., non-volatile memory component 230) of the memory sub-system 210. For example, the data retention component 213 may include and/or be communicatively coupled to various circuitry to facilitate monitoring of a temperature (e.g., a temperature sensor) of the memory sub-system 210, a portion of the memory sub-system 210, and/or a sub-portion of the memory sub-system 210; facilitate monitoring a duration of time that the memory sub-system 210, a portion of the memory sub-system 210, and/or a sub-portion of the memory sub-system 210 spent at the monitored temperature; facilitate monitoring a duration of an interruption of the delivery of power from a main power supply to the memory sub-system 210, a portion of the memory sub-system 210, and/or a sub-portion of the memory sub-system 210; etc. In some examples, the characteristic sensor 214 (e.g., temperature sensor, duration sensor, power supply sensor, etc.) may be configured to monitor temperature, temperature duration, and/or duration of main power supply interruption of a specific plurality of non-volatile memory components, a specific non-volatile memory component 230 of a plurality of non-volatile memory component, a specific die of a non-volatile memory component 230, a specific location where a specific page of data is stored on a non-volatile memory component 230, etc. The characteristic sensor 214 may report and/or make available for retrieval its measurements to the data retention component 213 directly and/or may write its measurements to a data repository commonly accessible by the data retention component 213 and/or the characteristic sensor 214.

The memory sub-system 210 may utilize power to operate. For example, the memory sub-system controller 215, the processor 217, the local memory 219, the non-volatile memory component 230, the local media controller 235, the memory device 240, the characteristic sensor 214, and/or the data retention component 213 may consume electricity in order to perform their various functions. The memory sub-system 210 may include additional components, not illustrated in FIG. 2, which may also utilize power to operate. For example, the memory sub-system 210 may include active cooling measures which consume electricity to cool the memory sub-system 210 and/or its various components. For example, the memory sub-system 210 may include cooling fans and/or cooling liquid circulation pumps which consume electricity to cool the memory sub-system 210 and/or its various components. These active cooling measures may function to keep components of the memory sub-system 210, such as the non-volatile memory component 230 and others, from reaching and/or sustaining a temperature and/or duration at that temperature associated with potential data damage, degradation, and/or loss.

Many of the components of the memory sub-system 210 may rely on power provided from a main power supply 242. As such, a main power supply 242 may be coupled to and/or provide power to the memory sub-system 210. The main power supply 242 may include a 12 Volt (V) power supply. For example, the memory sub-system 210 may be physical attached (e.g., via a power cord, backplane, power bus, etc.) to a main power supply 242 such as an outlet connected to an electrical power transmission grid. The main power supply 242 may be utilized to operate the components of the memory sub-system 210 while the device is powered on and receiving its full allocation of power from the connected main power supply 242.

For example, when the memory sub-system 210 is connected to the main power supply 242 and is in a fully on, fully operational, non-sleep, and/or non-off state, the memory sub-system 210 may utilize the main power supply 242 to power its components in order to execute their functions. For example, when the memory sub-system 210 is on and connected to the main power supply 242, the main power supply 242 may provide power to the memory sub-system controller 215, the memory device 240, the non-volatile memory component 230, any active colling measures, etc. As such, the memory sub-system may be under a full allocation (e.g., 12 V) of power from the main power supply 242 during active operation which may be provided through a primary power rail to operate the memory sub-system controller 215 and/or the non-volatile memory component 230. The main power supply 242 may provide the full power allocation which may be utilized for operating active cooling measures, interfacing with the host system 220 at high speeds, processing inputs/outputs (I/Os) to/from the host 220, and managing/performing accesses of multiple memory dies of the non-volatile memory component 230 in parallel to maintain its maximum performance capabilities with respect to the host system 220. In some examples, power from the main power supply 242 may be supplied to a regulator 248. The regulator 248 may regulate the voltage supplied by the main power supply 242 to a lower voltage level to be utilized by the non-volatile memory component 230.

The data retention component 213 and/or the characteristic sensor 214 utilized by the data retention component 213 may or may not operate while the memory sub-system 210 is fully on, fully operational, non-sleep, and/or non-off state, the memory sub-system 210. That is, the data retention component 213 and/or the characteristic sensor 214 utilized by the data retention component 213 may or may not receive and/or utilize power from the main power supply 242 in order to operate while the memory sub-system 210 is fully on, fully operational, non-sleep, and/or non-off state, the memory sub-system 210. In some examples, the data retention component 213 and/or the characteristic sensor 214 utilized by the data retention component 213 may not operate and/or utilize any power while the memory sub-system 210 is fully on, fully operational, non-sleep, and/or non-off state, the memory sub-system 210.

The data retention component 213 and/or the characteristic sensor 214 utilized by the data retention component 213 may be operational in the absence of power from the main power supply 242. For example, when the memory sub-system 210 is disconnected (e.g., unplugged) from the main power supply 242, when the flow of power from the main power supply 242 is interrupted, when the memory sub-system 210 is in an off state, when the memory sub-system 210 is not fully operational, when the memory sub-system 210 is in a sleep state, when the memory sub-system 210 is an off state, etc. the data retention component 213 and/or the characteristic sensor 214 utilized by the data retention component 213 may be operational. In the absence of the primary power supply 242, the memory sub-system controller 215 and/or processor 217 may not be operational and/or the firmware of the memory sub-system 210 may not be executing. In the absence of the primary power supply 242, the data retention component 213 and/or the characteristic sensor 214 may utilize power supplied from an auxiliary power supply 246 to operate.

An auxiliary power supply 246 may include a power supply that is not the main power supply 242. The auxiliary power supply 246 may include a secondary power reservoir such as a battery, a super capacitor, a low voltage power supply, etc. The auxiliary power supply 246 may be configured to store and/or supply less power than the primary power supply 242. For example, the auxiliary power supply 246 may include a 3.3 V power supply.

In some examples, the auxiliary power supply 246 may be a same auxiliary power supply utilized to provide power to other components of the memory sub-system 210 in the absence of power from the main power supply 242. For example, the auxiliary power supply 246 may be a same auxiliary power supply utilized to provide power to an EEPROM components of the memory sub-system 210 to operate in the absence of power from the main power supply 242.

The auxiliary power supply 246 may supply power (e.g., 3.3 V) to the data retention component 213 and/or the characteristic sensor 214 utilized by the data retention component 213 to perform its operations. In some examples, the auxiliary power supply 246 may supply its voltage (e.g., 3.3 V) to a regulator 248. The regulator 248 may regulate the data retention component 213 and/or the characteristic sensor 214 utilized by the data retention component 213. In other examples, the auxiliary power supply 246 may supply voltage to the data retention component 213 and/or the characteristic sensor 214 utilized by the data retention component 213 directly to perform its operations. For example, the auxiliary power supply 246 may supply voltage to the data retention component 213 and/or the characteristic sensor 214 utilized by the data retention component 213 via an auxiliary power supply rail.

The auxiliary power supply 246 may include a power supply that begins to supply power to the data retention component 213 and/or the characteristic sensor 214 utilized by the data retention component 213 at the time of and/or in response to the removal and/or interruption of the main power supply 242. In some examples, the auxiliary power supply 246 may utilize the main power supply 242 to charge and/or refill its power reserve capacity when the main power supply 242 is connected, operable, and providing power to the memory sub-system 210 and, when the main power supply 242 is absent the auxiliary power supply 246 may begin to supply power from its reservoir.

The auxiliary power supply 246 may continue to supply power to operate the data retention component 213 and/or the characteristic sensor 214 utilized by the data retention component 213 until the main power supply 242 is restored. As such, the auxiliary power supply 246 may be configured to operate to supply power to the data retention component 213 and/or the characteristic sensor 214 in the absence of the main power supply 242 until the main power supply 242 is restored and/or until the auxiliary power supply is depleted.

As such, the characteristic sensor 214 utilized by the data retention component 213 may operate in the absence of power from the main power supply 242 to continuously and/or periodically monitor a characteristic of the non-volatile memory components 230 without power from the main power supply 242. For example, the characteristic sensor 214 utilized by the data retention component 213 may continuously and/or periodically monitor a characteristic of the non-volatile memory components 230 while no power is provided from the main power supply 242 to the memory sub-system 210. Therefore, the characteristic sensor 214 utilized by the data retention component 213 may continuously and/or periodically monitor a characteristic of the non-volatile memory components 230 while the non-volatile memory component 230 is not operational and/or supplied with power from the main power supply 242. Additionally, the characteristic sensor 214 utilized by the data retention component 213 may continuously and/or periodically monitor a characteristic of the non-volatile memory components 230 while the memory subsystem controller 215 is not operational and/or supplied with power from the main power supply 242. Further, the characteristic sensor 214 utilized by the data retention component 213 may continuously and/or periodically monitor a characteristic of the non-volatile memory components 230 while any active cooling measures are not operational and/or supplied with power from the main power supply 242. Additionally, the characteristic sensor 214 utilized by the data retention component 213 may continuously and/or periodically monitor a characteristic of the non-volatile memory components 230 while the firmware of the memory sub-system 210 is not being executed.

Further, the data retention component 213 may operate in the absence of power from the main power supply 242 to receive, retrieve, and/or utilize the sensed characteristic of the non-volatile memory components 230 without utilizing power from the main power supply 242. For example, data retention component 213 may operate in the absence of power from the main power supply 242 to receive, retrieve, and/or utilize the sensed characteristic of the non-volatile memory components 230 while no power is provided from the main power supply 242 to the memory sub-system 210. Therefore, data retention component 213 may operate in the absence of power from the main power supply 242 to receive, retrieve, and/or utilize the sensed characteristic of the non-volatile memory components 230 while the non-volatile memory component 230 is not operational and/or supplied with power from the main power supply 242. Additionally, data retention component 213 may operate in the absence of power from the main power supply 242 to receive, retrieve, and/or utilize the sensed characteristic of the non-volatile memory components 230 while the memory subsystem controller 215 is not operational and/or supplied with power from the main power supply 242. Further, the data retention component 213 may operate in the absence of power from the main power supply 242 to receive, retrieve, and/or utilize the sensed characteristic of the non-volatile memory components 230 while any active cooling measures are not operational and/or supplied with power from the main power supply 242. Additionally, the data retention component 213 may operate in the absence of power from the main power supply 242 to receive, retrieve, and/or utilize the sensed characteristic of the non-volatile memory components 230 while the firmware of the memory sub-system 210 is not being executed.

In this manner, a characteristic of a memory sub-system 210 may be monitored and/or analyzed in the absence of power from a main power supply 242. For example, the characteristic sensor 214 may include a temperature sensor. The temperature sensor may be configured to sense the temperature of the memory sub-system 210, an environment that the memory sub-system resides in, a temperature of each of multiple non-volatile memory components, etc. and/or the duration of the temperature in the absence of power from the main power supply 242. The characteristic sensor 214 may include a power supply sensor. The power supply sensor may be configured to sense when the main power supply 242 is absent from a memory sub-system 210 and/or the amount of time over which the main power supply 242 has been absent from the memory sub-system 210 in the absence of power from the main power supply 242.

The data retention component 213 may be configured to operate, in the absence of power from the main power supply 242, utilizing an auxiliary power supply 246. The data retention component 213 may be configured to operate, in the absence of power from the main power supply 242, to monitor a characteristic of one or more of multiple non-volatile memory components 230. For example, the data retention component 213 may be configured to monitor data from a characteristic sensor 214. The data retention component 213 may be configured to monitor, for example, a temperature of one or more non-volatile memory components 230 and an amount of time since the power delivery from the main power supply to the memory sub-system 210 was interrupted. For example, the data retention component 213 may be configured to monitor these characteristics utilizing temperature data collected by a temperature sensor and/or utilizing power supply data collected by a power supply monitoring sensor.

The data retention component 213 may be configured to operate, in the absence of power from the main power supply 242, to predict, based on the monitored characteristic, an impending data loss event for one or more of the multiple non-volatile memory components 230. For example, the data retention component 213 may be configured to compare, in the absence of power from the main power supply 242, the monitored characteristic (e.g., a monitored temperature, a monitored amount of time at a temperature, duration of an interruption of power delivery from the main power supply 242, etc.) to a threshold level of the characteristic indicative of an impending data loss event for the non-volatile memory components 230.

As described above, the electrical charge stored in the non-volatile memory component 230 degrades over time. In addition, the charge may degrade much faster at higher temperatures over extended period of times. In some examples, the charge degradation may increase exponentially as temperature rises. Since the stored charge is indicative of the data stored at the non-volatile memory component 230, charge degradation may equate to data degradation. Once enough data degradation has occurred, a data loss event may occur.

A data loss event may include an instance when an original data value stored on the non-volatile memory component 230 is lost, modified, degraded, and/or otherwise rendered unreadable as the original data value. The data loss event may include instances where the original data value is readable as a different data value from the original value and/or instances where the original data value is no longer readable. For example, the data loss event may include instances where the stored data value is erroneous with respect to its original value and/or instances where a stored data value is absent.

An impending data loss event may include a data loss event that has happened, is going to happen, is projected to happen if conditions (e.g., the monitored characteristic) remain the same, is trending toward happening under the monitored characteristic, has exceeded or will exceed a probability threshold of happening, etc. For example, an impending data loss event may include a data loss event that has a likelihood of occurring that is above a certain threshold unless the currently monitored conditions are altered (e.g., power is restored to the memory sub-system 110, the temperature of the non-volatile memory component 230 is reduced, etc.).

The likelihood of a data loss event and/or a determination of whether it is impending may be based on physical properties, capabilities, and/or manufacturer specifications for the memory sub-system 210 and/or the non-volatile memory component 230. For example, a specification may exist for the memory sub-system 210 and/or the non-volatile memory component 230 of the memory subsystem 210 which specifies a relationship between an amount of time that delivery of power from a main power supply to the memory sub-system 210 is interrupted and an amount and/or likelihood of expected data loss events for the memory sub-system 210 and/or the non-volatile memory component 230 of the memory subsystem 210. Such a specification may be utilized to identify threshold value amounts of time during which power delivery from a main power source to a memory sub-system being interrupted is predictive of and/or indicates an impending data loss event.

Likewise, a specification may exist for the memory sub-system 210 and/or the non-volatile memory component 230 of the memory subsystem 210 which specifies a relationship between a temperature of the memory sub-system 210 and/or the non-volatile memory component 230 and an amount and/or likelihood of expected data loss events for the memory sub-system 210 and/or the non-volatile memory component 230 of the memory subsystem 210. Further, the specification may specify a relationship between a time at the temperature for the memory sub-system 210 and/or the non-volatile memory component 230 and an amount and/or likelihood of expected data loss events for the memory sub-system 210 and/or the non-volatile memory component 230 of the memory subsystem 210. Such a specification may be utilized to identify threshold value temperatures and/or amounts of time at those temperatures during which power delivery from a main power source to a memory sub-system being interrupted is predictive of and/or indicates an impending data loss event.

In some examples, an error rate associated with stored data values may be utilized to identify threshold error rate values during which power delivery from a main power source to a memory sub-system being interrupted is predictive of and/or indicates an impending data loss event. For example, a raw bit error rate (RBER) associated with the memory sub-system 210 and/or the non-volatile memory component 230 may signify an impending data loss event when the RBER exceeds a threshold error rate value defined by an error correction capability of an ECC component of the memory sub-system 210. For example, the data retention component 213 may be configured to compare, in the absence of power from a main power supply, a monitored characteristic to a threshold level for that monitored characteristic beyond which a bit error rate associated with data stored in the non-volatile memory components 230 is projected to exceed an error correction capability of the memory sub-system 210.

The data retention component 213 may be configured to generate, in the absence of power from the main power supply 242, a data loss warning signal to signal the predicted impending data loss event. For example, in response to the monitored characteristic meeting and/or exceeding the threshold level indicative of a data loss event, the data retention component 213 may generate a data loss warning. For example, responsive to a monitored temperature of one or more of multiple non-volatile memory components 230 and/or a time since the power delivery from the main power supply 242 to the memory sub-system 210 was interrupted meeting or exceeding a threshold temperature, time at temperature, duration of main power supply power delivery interruption, etc. associated with causing a bit error rate of the non-volatile memory component 230 that exceeds the ECC capacity of the memory sub-system 210, the data retention component may generate a warning The data loss warning may include a signal to a user and/or administrator of the memory sub-system 210. For example, the data loss warning may include a message such as an email, a text message, a telephone call, etc. Additionally, or alternatively, the data loss warning may include an auditory warning. For example, the data loss warning may include a beep, buzz, chirp, etc. generated by a speaker, piezo electric buzzer, etc. Additionally, or alternatively, the data loss warning may include a visual warning. For example, the data loss warning may include causing a light to emit light, causing a light to cease emitting light, causing a light to flash, causing a light to flash a particular pattern, etc. The data loss warning may be a signal to a human user to communicate that a data loss event is impending and to spur the user to intervene such as by restoring the power to the memory sub-system 210.

For example, a memory sub-system 210 may be fully operational in an on state. The memory sub-system 210 in the on state may be receiving 12V of power from a main power supply. The power from the main power supply 242 may be delivered to the memory sub-system 210 components over a main power rail. The power from the main power supply 242 may be utilized for operating active cooling measures, interfacing with the host system 220 at high speeds, processing inputs/outputs (I/Os) to/from the host 220, and managing/performing accesses of one or more of multiple memory dies of the non-volatile memory component 230 in parallel to maintain its maximum performance capabilities with respect to the host system 220.

At some point, the power delivery from the main power supply 242 to the memory sub-system 210 may be interrupted. In response to this interruption power from an auxiliary power supply 246 may begin to be provided to some components of the memory sub-system 210. For example, power may be provided from the auxiliary power supply 246 to the data retention component 213 and/or the characteristic sensor 214. Therefore, the data retention component 213 and/or the characteristic sensor 214 may become and/or remain operational in the absence of power from the main power supply 242.

Accordingly, the characteristic sensor 214 may sense characteristics of the non-volatile memory component 230 in the absence of power from the main power supply 242. For example, the characteristic sensor 214 may sense the temperature of the non-volatile memory component 230 in the absence of power from the main power supply 242. Since the active cooling measures of the memory sub-system 210 may rely on the power from the main power supply 242 to cool the memory sub-system 210, the temperatures may reach, exceed, and/or be sustained at levels associated with an increased incidence of data degradation. However, since the power from the main power supply 242 is absent, the memory sub-system 210 may have no ability to cool itself.

The data retention component 213, utilizing axillary power from the auxiliary power supply 246 in the absence of the main power supply 242, may monitor the sensed characteristics and compare them to threshold amounts. For example, the data retention component 213 may monitor a sensed temperature, a duration of a sensed temperature, a duration of the absence of the power from the main power supply, etc. and compare them to threshold amounts that, once reaches and/or exceeded, are associated with an impending data loss event at the non-volatile memory component 230. Again, without the power from the main power supply 242, the memory sub-system 210 may be powerless to actively cool the non-volatile memory component and/or to restore power from the main power supply 242.

Instead, the data retention component 213, utilizing axillary power from the auxiliary power supply 246 in the absence of the main power supply 242, may alert a user to attempt to spur an intervention. For example, the data retention component 213 may generate a warning responsive to the monitored characteristic exceeding a corresponding threshold level to alert a user to the impending data loss event. In this manner, a user may become aware of the impending data loss event and, as a result, investigate and discover an underlying issue (e.g., a disconnected, interrupted, malfunctioning, etc. main power supply 242; a storage temperature exceeding a manufacturer specification; an unpowered storage duration exceeding a manufacturer specification, etc.) and/or work to remedy the underlying issue. For example, the user may be prompted to restore the main power supply 242 to the memory sub-system 210, instigate active cooling of the memory sub-system 210, and/or begin to refresh and/or correct data stored in the non-volatile memory component 230 to prevent the impending data loss event and/or additional data loss events.

Figure 3:
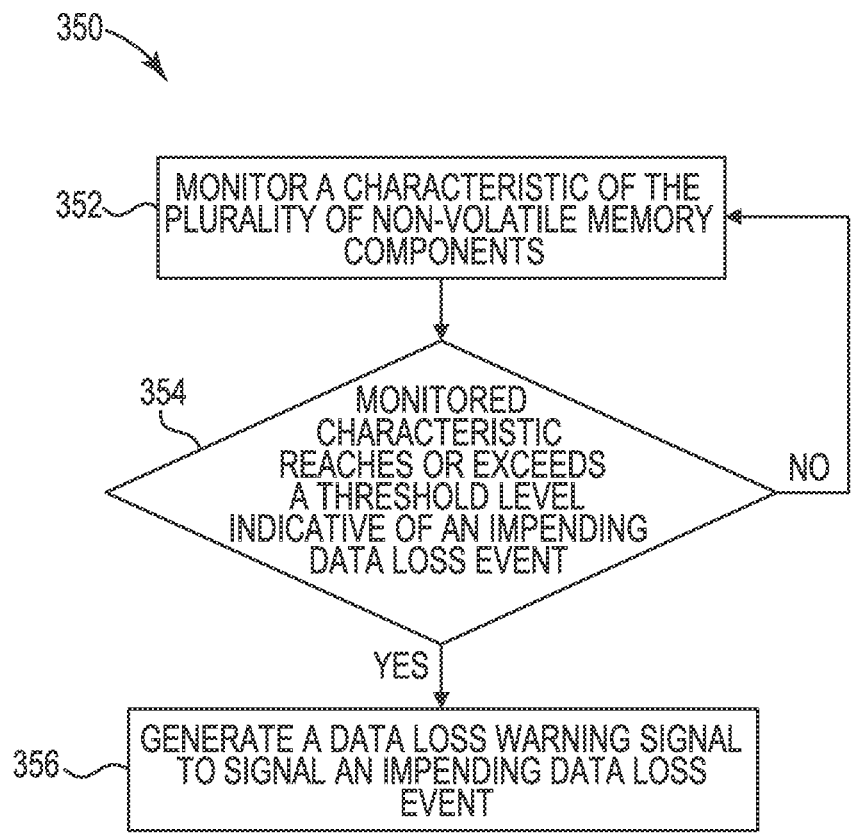
FIG. 3 is a flow diagram corresponding to memory sub-system data loss prediction in accordance with some embodiments of the present disclosure.

FIG. 3 is a flow diagram of an example method 350 for memory sub-system data loss prediction in accordance with some embodiments of the present disclosure. The method 350 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 350 is performed by the data retention component 113 of FIG. 1 or 213 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 352, the processing device can monitor a characteristic of one or more non-volatile memory components of the memory sub-system. For example, the characteristic of a non-volatile memory component may be monitored by a characteristic sensor such as characteristic sensor 214 illustrated in FIG. 2. In some embodiments, a characteristic such as a temperature of the non-volatile memory component and/or an amount of time that the non-volatile memory component spent at that temperature may be monitored by a temperature sensor. In some embodiments, a characteristic such as an amount of time or duration of an interruption to power delivery from the main power supply to the memory sub-system and/or its non-volatile memory component may be monitored by a power supply sensor.

At operation 354, a determination can be made as to whether the monitored characteristic of the one or more of multiple non-volatile memory components of the memory sub-system has reached or exceeded a threshold level. The threshold level may be an amount of the characteristic indicative of an impending data loss event at one or more of multiple non-volatile memory components. If the monitored characteristic of the one or more of multiple non-volatile memory components of the memory sub-system has not reached or exceeded the threshold indicative of an impending data loss event, the flow 350 can return to operation 352 and the one or more of multiple non-volatile memory components of the memory sub-system may continue to be monitored by the data retention component.

If, however, it is determined that the characteristic of the one or more of multiple non-volatile memory components of the memory sub-system has reached or exceeded a threshold level, at operation 356, a data loss warning signal may be generated. The data loss warning signal may include an auditory and/or visual warning to signal an impending data loss event. For example, the data loss warning signal may signal a prediction by the data retention component that the monitored characteristics are indicative of data degradation at the non-volatile memory components to an extent that exceeds the capability of an ECC component of the memory subsystem to correct.

The operations 352, 354, 356, etc. of flow 350 may be performed in the absence of power from a main power supply. For example, the operations 352, 354, 356, etc. of flow 350 may be performed when the memory sub-system is switched off and/or is disconnected from a main power supply. In some examples, the operations 352, 354, 356, etc. of flow 350 may be performed utilizing power from an auxiliary power supply that provides less power than the main power supply and provides the power only in the absence of the power from the main power supply.

Figure 4:
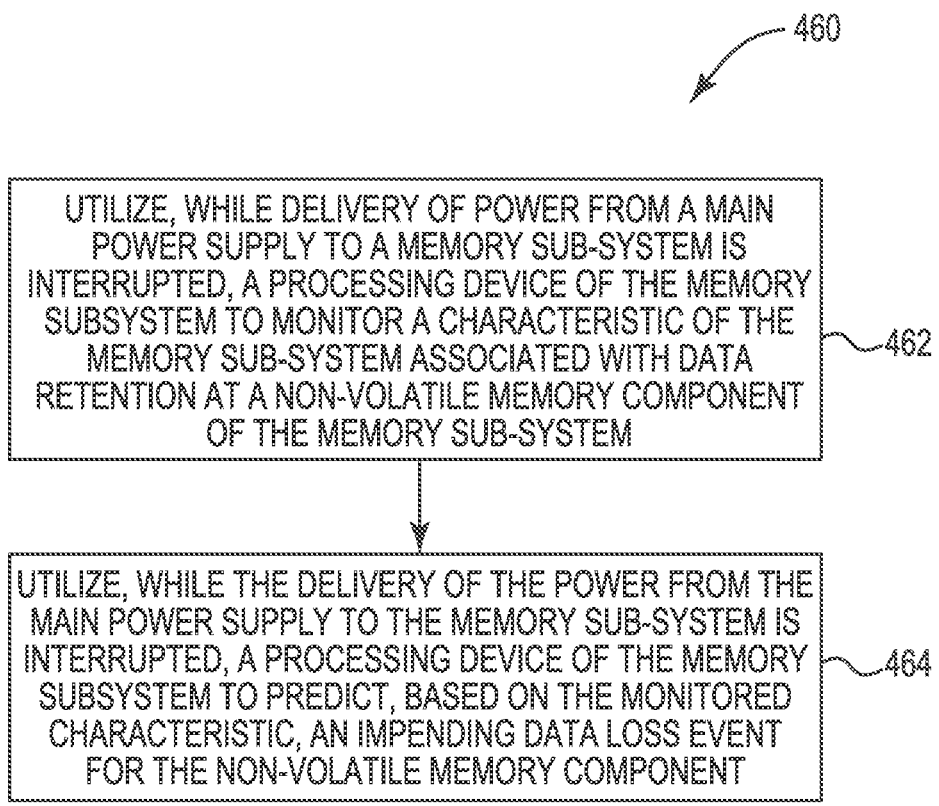
FIG. 4 is a flow diagram corresponding to a method for memory sub-system data loss prediction in accordance with some embodiments of the present disclosure.

FIG. 4 is flow diagram corresponding to a method 460 for memory sub-system data loss prediction in accordance with some embodiments of the present disclosure. The method 460 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 460 is performed by the data retention component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 462, a processing device such as a data retention component 113 illustrated in FIG. 1, may be utilized, when delivery of power from a power supply to a memory sub-system is interrupted, to monitor a characteristic of the memory sub-system. The characteristic may include a characteristic associated with data retention at a non-volatile memory component of the memory subsystem. For example, the processing device may be utilized, while delivery of power from a power supply to a memory sub-system is interrupted, to monitor a temperature of the non-volatile memory component and/or a duration of time that the non-volatile memory component was at that temperature. In another example, the processing device may be utilized, while delivery of power from a power supply to a memory sub-system is interrupted, to monitor an amount of time that delivery of power from a power supply to a memory sub-system is interrupted. The processing device may, while delivery of power from a power supply to a memory sub-system is interrupted, perform operation 462 and/or the subsequently described operations utilizing a reserve of power stored by the memory sub-system to provide power to the processing device of the memory sub-system to utilize the processing device while delivery of power from the main power supply to the memory subsystem is interrupted.

At operation 464, the processing device may be utilized, while delivery of power from a power supply to a memory sub-system is interrupted, to predict, based on the monitored characteristic, an impending data loss event for the non-volatile memory component. In some examples, the processing device may be utilized, while delivery of power from a power supply to a memory sub-system is interrupted, to predict an impending data loss event for the non-volatile memory component by performing a comparison of the monitored characteristic to a threshold value of the monitored characteristic associated with the data loss event. For example, if the monitored characteristic indicates that the non-volatile memory component was subjected to a particular temperature that exceeds a threshold temperature associated with data loss events and/or that the power from the primary power supply was absent from the non-volatile memory component for a particular amount of time that exceeds a threshold time without power associated with data loss events, then the processing device may predict an impending data loss event. However, if the monitored characteristic indicates that the temperature of the non-volatile memory component has not reached or exceeded a threshold temperature associated with data loss events and/or that the amount of time that the non-volatile memory component has gone without power has not reached or exceeded a threshold time without power associated with data loss events, then the processing device may not predict an impending data loss event and/or the processing device may resume monitoring of the characteristic of the non-volatile memory component.

The processing device may be utilized, while delivery of power from a power supply to a memory sub-system is interrupted, to generate a data loss warning responsive to predicting the impending data loss event. The data loss warning may be persisted in the absence of power delivery from the main power supply until the delivery of power from main power supply to the memory sub-system is restored. In some examples, the processing device may be utilized, while delivery of power from a power supply to a memory sub-system is interrupted, to determine, based on the monitored characteristic, whether a data retention limit threshold has been reached for the memory sub-system. For example, the data retention limit threshold may include a threshold value of the monitored characteristic which represents a limit amount past which the data loss event is projected to be inevitable and/or uncorrectable. The processing device may persist the data loss warning until the data retention limit threshold is determined to have been reached by the monitored characteristic. Once the processing device determines that the data retention limit threshold has been reached or exceeded by the monitored characteristic, the processing device may terminate delivery of the warning as total and/or unrecoverable data loss may be assumed.

Figure 5:
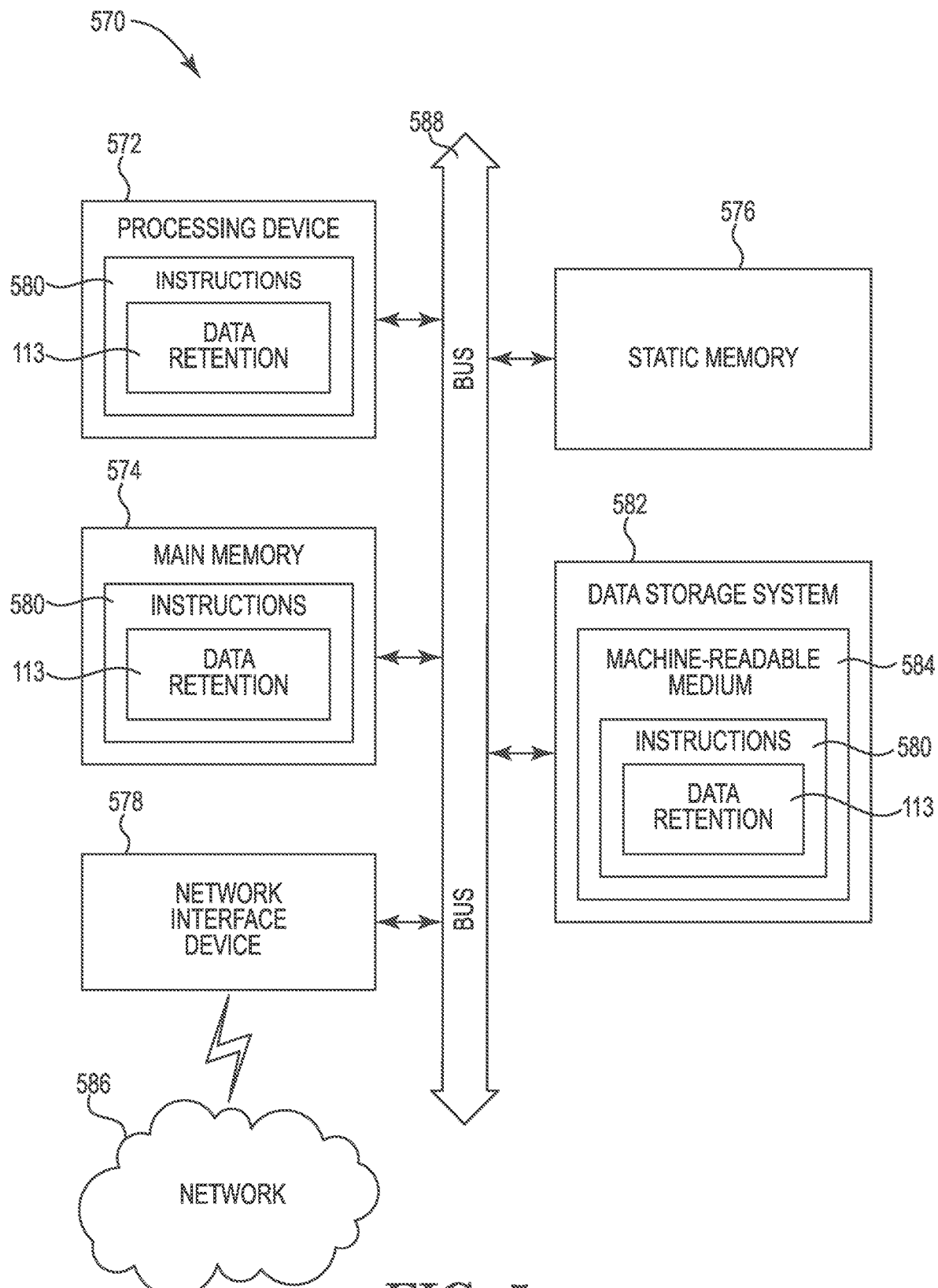
FIG. 5 is a block diagram of an example computer system in which embodiments of the present disclosure may operate.

FIG. 5 is a block diagram of an example computer system 570 in which embodiments of the present disclosure may operate. For example, FIG. 5 illustrates an example machine of a computer system 570 within which a set of instructions, for causing the machine to perform any one or more of the methodologies discussed herein, can be executed. In some embodiments, the computer system 570 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute instructions to perform operations corresponding to the data retention component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 570 includes a processing device 572, a main memory 574 (e.g., read-only memory (ROM), flash memory, dynamic random access memory (DRAM) such as synchronous DRAM (SDRAM) or Rambus DRAM (RDRAM), etc.), a static memory 576 (e.g., flash memory, static random access memory (SRAM), etc.), and a data storage system 582, which communicate with each other via a bus 588.

The processing device 572 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 572 can also be one or more special-purpose processing devices such as an application specific integrated circuit (ASIC), a field programmable gate array (FPGA), a digital signal processor (DSP), network processor, or the like. The processing device 572 is configured to execute instructions 580 for performing the operations and steps discussed herein. The computer system 570 can further include a network interface device 578 to communicate over the network 586.

The data storage system 582 can include a machine-readable storage medium 584 (also known as a computer-readable medium) on which is stored one or more sets of instructions 580 or software embodying any one or more of the methodologies or functions described herein. The instructions 580 can also reside, completely or at least partially, within the main memory 574 and/or within the processing device 572 during execution thereof by the computer system 570, the main memory 574 and the processing device 572 also constituting machine-readable storage media. The machine-readable storage medium 584, data storage system 582, and/or main memory 574 can correspond to the memory sub-system 110 of FIG. 1.

In one embodiment, the instructions 580 include instructions to implement functionality corresponding to a data retention component (e.g., the data retention component 113 of FIG. 1). While the machine-readable storage medium 584 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
utilizing, while delivery of power from a main power supply to a memory sub-system is interrupted for particular portions of the plurality of the memory sub-system when other portions receive power from the main power supply, a processing device of the memory sub-system to:
  monitor a characteristic of particular portions of the memory sub-system, that do not receive power from the main power supply, associated with data retention at a non-volatile memory component of the memory sub-system; and
  predict, based on the monitored characteristic, an impending data loss event for the non-volatile memory component.

2. The method of claim 1, further comprising:
utilizing, while the delivery of the power from the main power supply to the memory sub-system is interrupted, the processing device of the memory sub-system to:
  generate a data loss warning responsive to predicting the impending data loss event.

3. The method of claim 2, further comprising:
utilizing, while the delivery of the power from the main power supply to the memory sub-system is interrupted, the processing device of the memory sub-system to:
  persist the data loss warning until the delivery of the power from the main power supply to the memory sub-system is restored.

4. The method of claim 2, further comprising:
utilizing, while the delivery of the power from the main power supply to the memory sub-system is interrupted, the processing device of the memory sub-system to:
  determine, based on the monitored characteristic, whether a data retention limit threshold has been reached for the memory sub-system; and
  persist the data loss warning until the data retention limit threshold is determined to have been reached.

5. The method of claim 1, further comprising:
utilizing a reserve of power stored by the memory sub-system to provide power to the processing device of the memory sub-system to utilize the processing device of the memory sub-system while the delivery of the power from the main power supply to the memory sub-system is interrupted.

6. The method of claim 1, wherein utilizing, while the delivery of the power from the main power supply to the memory sub-system is interrupted, the processing device of the memory sub-system to monitor the characteristic of the memory sub-system associated with data retention at the non-volatile memory component includes utilizing, while the delivery of the power from the main power supply to the memory sub-system is interrupted, the processing device of the memory sub-system to monitor a temperature of the non-volatile memory component.

7. The method of claim 1, wherein utilizing, while the delivery of the power from the main power supply to the memory sub-system is interrupted, the processing device of the memory sub-system to monitor the characteristic of the memory sub-system associated with data retention at the non-volatile memory component includes utilizing, while the delivery of the power from the main power supply to the memory sub-system is interrupted, the processing device of the memory sub-system to monitor a duration of the interruption of the delivery of the power from the power supply to the memory sub-system.

8. The method of claim 1, wherein utilizing, while the delivery of the power from the main power supply to the memory sub-system is interrupted, the processing device of the memory sub-system to predict, based on the monitored characteristic, the impending data loss event includes utilizing, while the delivery of the power from the main power supply to the memory sub-system is interrupted, the processing device of the memory sub-system to compare the monitored characteristic to a threshold value of the monitored characteristic associated with the data loss event.

9. An apparatus, comprising:
a plurality of non-volatile memory components;
a processing device configured to operate, in an absence of power from a main power supply for particular portions of the plurality of non-volatile memory components when other portions receive power from the main power supply, to:
  monitor a characteristic of the particular portions of the plurality of non-volatile memory components that do not receive power from the main power supply; and
  predict, based on the monitored characteristic, an impending data loss event for the particular portions of the plurality of non-volatile memory components that do not receive power from the main power supply; and
  generate a data loss warning signal to signal the predicted impending data loss event.

10. The apparatus of claim 9, further comprising a temperature sensor configured to sense a temperature of the plurality of non-volatile memory components.

11. The apparatus of claim 10, wherein the monitored characteristic includes the sensed temperature of the plurality of non-volatile memory components.

12. The apparatus of claim 9, wherein the monitored characteristic includes an amount of time that the power from the main power supply has been absent.

13. The apparatus of claim 9, wherein the data loss warning signal includes an auditory alarm.

14. The apparatus of claim 9, wherein the data loss warning signal includes a visual alarm.

15. The apparatus of claim 9, further comprising an auxiliary power supply power to the processing device to operate in the absence of power from the main power supply.

16. A system, comprising:
a plurality of non-volatile memory components;
a processing device configured to operate, during an interruption of a delivery of power from a main power supply to particular portions of the plurality of non-volatile memory components when other portions receive power from the main power supply, to:
  monitor a temperature of the particular portions of the plurality of non-volatile memory components that do not receive power from the main power supply and a duration of the interruption;
  compare the monitored temperature and the monitored duration of the interruption to a criteria indicative of an impending data loss event for particular portions of the plurality of non-volatile memory components that do not receive power from the main power supply; and
  generate a warning responsive to the criteria being met.

17. The system of claim 16, wherein an active cooling measure of the system is disabled during the interruption.

18. The system of claim 16, wherein the criteria is a threshold level beyond which a bit error rate associated with data stored in the plurality of non-volatile memory components is projected to exceed an error correction capability of the system.

19. The system of claim 16, wherein each non-volatile memory component of the plurality of non-volatile memory components comprises a NAND flash memory array.

* * * * *